T. B. FUNK AND L. G. HUNT.
VAPORIZER FOR INTERNAL COMBUSTION ENGINES.
APPLICATION FILED APR. 6, 1918.
1,355,076.
Patented Oct. 5, 1920.
3 SHEETS—SHEET 2.
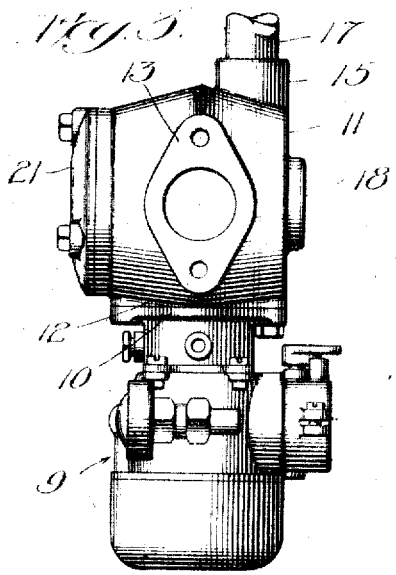
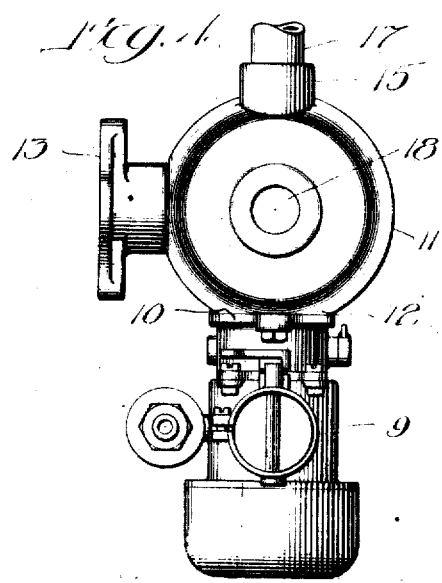
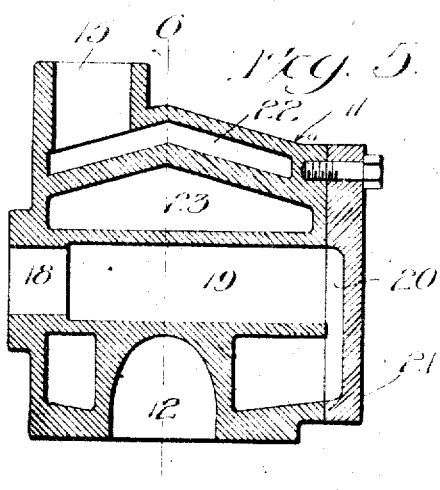
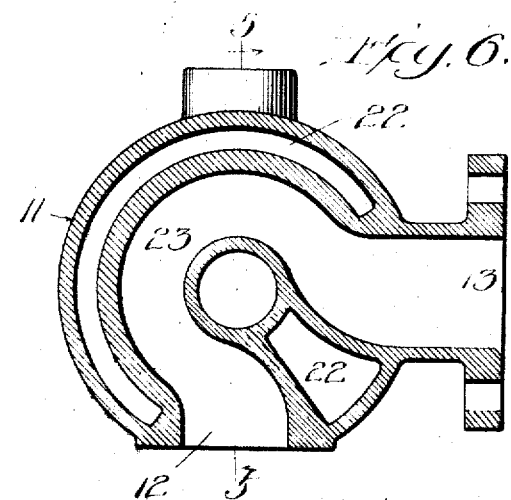
Witness:
Harry S. Guither
Inventors
Truman B. Funk
Logan G. Hunt
by Ramsey & Ramsey Attys T. B. FUNK AND L. G. HUNT.
VAPORIZER FOR INTERNAL COMBUSTION ENGINES.
APPLICATION FILED APR. 6, 1916.

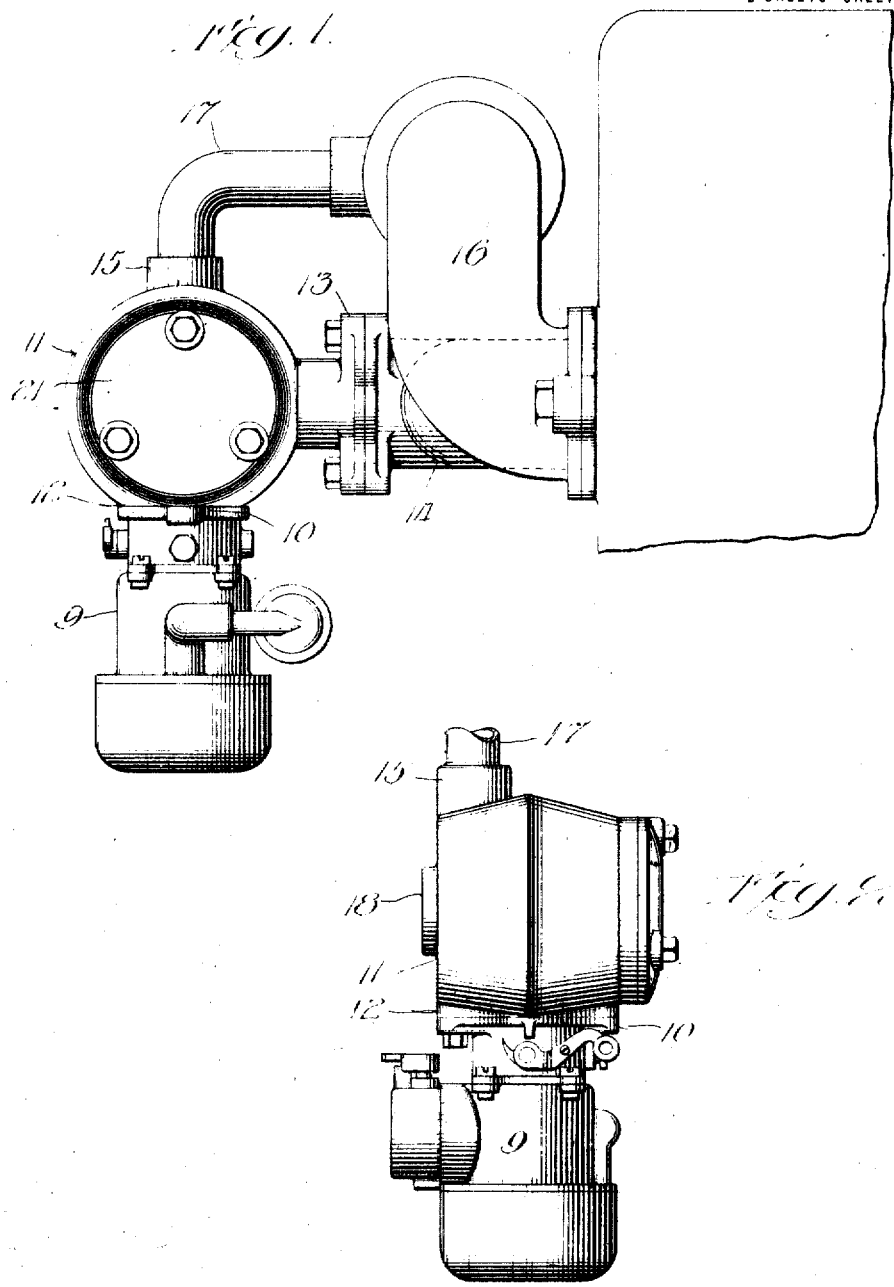

1,355,076.

Patented Oct. 5, 1920.
3 SHEETS—SHEET 3.

UNITED STATES PATENT OFFICE.

TRUMAN B. FUNK, OF MOLINE, AND LOGAN G. HUNT, OF ROCK ISLAND, ILLINOIS, ASSIGNORS TO MOLINE PLOW COMPANY, OF MOLINE, ILLINOIS, A CORPORATION OF ILLINOIS.

VAPORIZER FOR INTERNAL-COMBUSTION ENGINES.

1,355,076.  Specification of Letters Patent.  Patented Oct. 5, 1920.

Application filed April 6, 1918. Serial No. 227,045.

*To all whom it may concern:*

Be it known that we, TRUMAN B. FUNK and LOGAN G. HUNT, both citizens of the United States, residing, respectively, at Moline and Rock Island, in the county of Rock Island and State of Illinois, have invented certain new and useful Improvements in Vaporizers for Internal-Combustion Engines, of which the following is a specification.

In the operation of internal combustion engines by the use of liquid fuels, the mixture of fuel and gas is more or less imperfect owing to the fact that the fuel portion of the mixture is in a more or less liquid condition instead of being perfectly volatilized. The vaporization of the fuel portion of the mixture will depend largely upon the temperature thereof, since only those portions of the fuel will vaporize in the mixture which have a boiling point below the instantaneous temperature of the mixture. Consequently, as the mixture leaves the carbureter, it is more or less "wet," consisting of air and fine particles of "atomized" fuel.

The combustion or firing of the mixture in the cylinders will depend largely upon the perfection of the vaporization process, and the larger the percentage of fuel in vaporous condition prior to introduction in the cylinder, the more perfect will be the combustion in the cylinder. Manifestly the higher distillates, such as kerosene and the like, having relatively high boiling points, will be relatively imperfectly vaporized, so that the firing will be relatively imperfect.

The operation will be improved by improving the imperfection of the vaporization. This may be done by raising the temperature of the mixture after it leaves the carbureter and before it is delivered to the cylinder to such a point that the fuel will be more or less perfectly vaporized. Nevertheless the temperature should not be raised so high as to actually fire or explode the mixture by bringing about combustion prior to reaching the cylinder.

One of the objects of the invention is to improve the operation of the engine by the method of heating the mixture of fuel and air after leaving the carbureter and before delivering to the cylinder, so as to more or less perfectly vaporize all portions of the fuel. Another object of the invention is to provide means for accomplishing the foregoing result.

The most convenient source of heat for bringing about this heating is the heat of exhaust gases from the engine itself. Another object of the invention is to provide means for heating the mixture by the use of the heat of the exhaust gases themselves.

Experience has shown that the most perfect vaporization may be brought about by bringing the particles of moisture into actual or direct contact with a hot surface. Since the mixture passing into the cylinder is of relatively large volume, it follows that special means should be provided for effecting contact between all portions of the fuel particles and the hot surface. We have, therefore, provided means for accomplishing this result, and will mention at this point that, in the particular arrangement illustrated, this means consists specifically of the use of a centrifugal arrangement whereby the relatively high specific gravity of the moist particles is taken advantage of for the purpose of throwing them against the hot surface.

In many cases a sufficient amount of heat for the present purpose may be obtained by the use of only a portion of the total volume of exhaust gases. Such being the case, it is only necessary to divert a portion of the exhaust gases and deliver the same through the heating device.

Since the back pressure in the exhaust line depends largely upon the volume of the exhaust gas, it follows that the tendency for exhaust gas to divert and pass through the heating device will vary to some extent according to the volume of exhaust, but this variation is not in the proper proportion at all times. Furthermore, it is found that at low speed of operation of the engine the back pressure will ordinarily be so weak that there will not be a sufficient amount of exhaust gas diverted and passed through the heating device to successfully operate the same. Another feature of the invention, therefore, has to do with the provision of means for automatically providing a sufficient amount of back pressure at all times to insure the diversion of such a volume of exhaust gases as will insure proper operation of the heating arrangement at all practical speeds of the engine.

Other objects and uses of the invention will appear from a detailed description of the same which consists in the features of construction and combinations of parts hereinafter described and claimed.

In the drawings:

Figure 1 shows a front view of a combination arrangement including a carbureter, vaporizer, and exhaust pipe connection embodying the features of the present invention;

Fig. 2 is a side view corresponding to Fig. 1;

Fig. 3 is a view from the opposite side as compared to Fig. 2;

Fig. 4 is a back view corresponding to Figs. 1, 2, and 3;

Fig. 5 is a vertical longitudinal section taken on the line 5—5 of Fig. 6, looking in the direction of the arrows;

Fig. 6 is a vertical cross section taken on the line 6—6 of Fig. 5, looking in the direction of the arrows;

Figure 7:
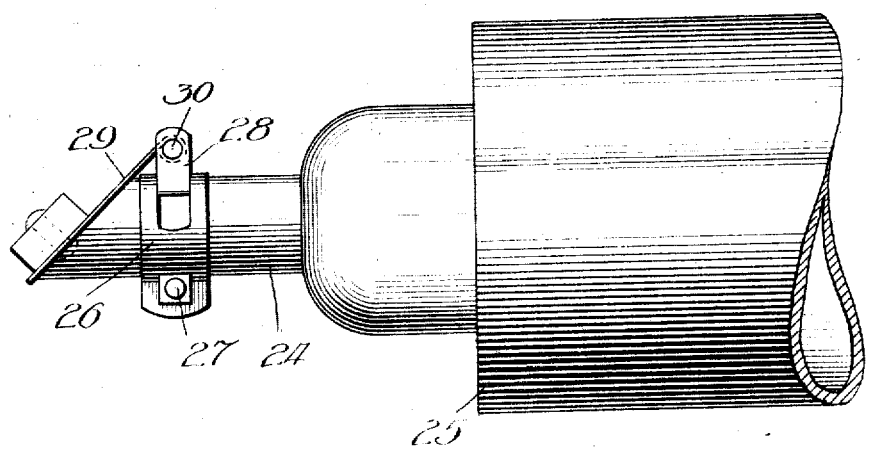
Figure 8:
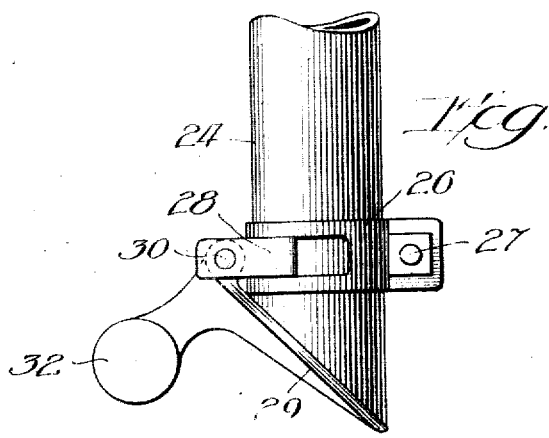

Fig. 7 is a detail view of an attachment to be put on the discharge end of the muffler or exhaust pipe for the purpose of creating the slight amount of back pressure necessary to insure proper operation of the vaporizer, the same being for use in those cases where the discharge end lies in a horizontal position; and Fig. 8 is a view corresponding to Fig. 7, showing an arrangement intended for use in those cases where the discharge end lies in a vertical position.

We will not in this application illustrate in detail or describe except in a general way either the carbureter or the engine construction, for the reason that these constructions are well known in the art and may manifestly be of whatever arrangement is desired. We will state, however, that the arrangement of the present invention is shown as being such that it can be directly connected to a particular form of carbureter, and to the gas manifold of a familiar form of engine, being interposed between these parts.

The carbureter is illustrated in its entirety by the numeral 9. At its upper end, it is provided with a flanged connection 10 by which it may be attached to the instrumentality to which the gas is delivered. In the present case this instrumentality is the vaporizer 11. This vaporizer is of generally cylindrical form and is conveniently made up as a casing having on its interior those passages which are desirable for the proper flow of the gases and vaporization of the fuel. This vaporizer has the connection 12 by which it is attached to the upper end or connection 10 of the carbureter; and it has a flanged connection 13 by which it is attached to the gas manifold 14 of the engine to which the mixture is finally delivered; it has an exhaust gas connection 15 into which is delivered a portion of the exhaust gas from the exhaust manifold 16 by way of the pipe 17; and it has an exhaust outlet 18 through which said portion of exhaust gas is finally discharged.

Referring particularly to Figs. 5 and 6, it will be seen that on its interior the vaporizer is provided with a central longitudinal or axial passage 19 communicating at one end with the discharge opening 18 and at the other end communicating with a passage 20 which is provided by means of a cap 21, which sets upon and closes over the front end of the vaporizer. This passage 21 also communicates with a circular passage 22 which surrounds the major portion of the outside of the vaporizer, and into which passage 22 the exhaust gases are delivered through the connection 15. Consequently the exhaust gases entering through the connection 15 travel around the outside passage 22 across the passage 20 and longitudinally or lengthwise of the central passage 19 and are discharged through the opening 18. Between the passages 19 and 22 is a vaporizing or mixture passage 23 which extends in circular fashion from the mixture inlet connection 12 to the mixture delivery connection 13. This passage 23 has its outer surface heated by the heat of the gases in the passage 22, and its inner surface heated by the heat of the gases in the passage 19. That is to say, both surfaces of the passage 23 are heated by the exhaust gases. On account of the shape of the passage 23 the carbureted mixture is first thrown in one direction and, therefore, into contact with the inner wall of the passage; then it is thrown in the other direction, and thus violently into contact with the other surface of the passage 23. As the mixture is rapidly drawn through the passage 23, its direction is rapidly changed, so that a relatively large centrifugal action is produced, thereby throwing all of the liquid portions of fuel into contact with the hot surface, and thus effectively vaporizing them before they are delivered to the inlet manifold of the engine.

It is to be observed that the vaporization of the particles of fuel, as well as the heating of the air of the mixture, will increase the volume thereof. It will be observed from an examination of Figs. 5 and 6 that the area of the passage 23 is greater on the discharge side than on the inlet side, thereby compensating for this increase in volume.

As previously stated, the back pressure may not always be sufficiently large to deliver a sufficient volume of exhaust gas through the vaporizer to insure its satisfactory operation at all times. We have, therefore, shown in Figs. 7 and 8 illustrative attachments which may be put upon the delivery end of the exhaust line so as to automatically maintain a suitable amount of back pressure at all times. In the arrangement shown in Fig. 7, the delivery end 24 of the exhaust line extends in a horizontal direction from the muffler 25, which muffler receives the gas from the exhaust manifold 16. A sleeve 26 is clamped onto the discharge connection 24 by a nut 27, which sleeve has one or more upstanding lugs 28 between which is pivoted a door 29 on the horizontal pivot 30. A weight 31 on the door tends to keep the same closed at all times with a sufficient force to insure the desired amount of back pressure.

In the arrangement shown in Fig. 8, the discharge connection 24 extends vertically downward. In this case the weight 32 is offset or so formed that it will tend to keep the door closed up against the lower or discharge end of the connection 24.

While we have herein shown and described only certain embodiments of the features of our invention, still we do not limit ourselves to the said embodiments, except as we may do so in the claims.

We claim:

1. The combination with the intake connection, exhaust connection, and carbureter of an internal combustion engine, of a vaporizer interposed between the carbureter and the intake and exhaust connections, said vaporizer comprising a cylindrical body member having a longitudinally extending exhaust gas passage, a circular mixture passage surrounding the longitudinally extending exhaust gas passage, a connection from one end of the mixture passage to the carbureter, a connection from the other end of the mixture passage to the intake connection of the engine, an arcuate exhaust gas passage embracing the circular mixture passage, a connection from the arcuate exhaust gas passage to the longitudinally extending exhaust gas passage, and a connection from the arcuate exhaust gas passage to the exhaust connection of the engine, substantially as described.

2. The combination with the intake connection, exhaust connection, and carbureter of an internal combustion engine, of a heater interposed between the carbureter and the intake and exhaust connections, said heater comprising a cylindrical member having three concentric passages, the innermost and outermost passages being exhaust gas passages and the intermediate passage being a mixture passage, a connection between the innermost and outermost passages for the transfer of exhaust gas between them, a connection from the carbureter to one end of the mixture passage, a connection from the other end of the mixture passage to the intake connection of the engine, and a connection from the outermost passage to the exhaust connection, substantially as described.

TRUMAN B. FUNK.
LOGAN G. HUNT.